United States Patent [19]

Bishop

[11] 4,078,031

[45] Mar. 7, 1978

[54] METHOD OF MAKING A MAGNETIC FLEXIBLE PRINTING PLATE

[76] Inventor: Homer L. Bishop, P.O. Box 35, West Carrollton, Ohio 45449

[21] Appl. No.: 697,386

[22] Filed: Jun. 18, 1976

Related U.S. Application Data

[63] Continuation-in-part of Ser. No. 452,058, Mar. 18, 1974, abandoned, which is a continuation-in-part of Ser. No. 194,651, Nov. 1, 1971, abandoned, and Ser. No. 290,852, Sep. 21, 1972, Pat. No. 3,837,959.

[51] Int. Cl.2 ........................ B29C 5/12; B29C 17/10; B29D 9/00

[52] U.S. Cl. ............................ 264/163; 101/382 MV; 101/401.1; 101/401.2; 264/234; 264/255; 264/259; 264/293; 264/295; 264/296; 264/313; 264/314; 264/319; 264/320

[58] Field of Search ............... 264/139, 148, 162, 212, 264/220, 227, 239, 248, 257, 255, 313, 334, 214, 241, 293, 163, 250, 320, 345, 295, 296, 223, 338, 259, 314, 319; 101/401.1, 401.2, 382 MV; 156/246, 250, 306

[56] References Cited

U.S. PATENT DOCUMENTS

| | | | |
|---|---|---|---|
| 912,092 | 2/1909 | Droitcour | 264/293 |
| 1,707,729 | 4/1929 | Kelley | 101/401.1 |
| 2,108,822 | 2/1938 | Lippincott | 101/401.2 |
| 2,834,052 | 5/1958 | Hunn | 264/22 |
| 3,031,959 | 5/1962 | Libberton | 101/395 |
| 3,124,068 | 3/1964 | Thomas | 101/401.1 |
| 3,124,725 | 3/1964 | Legullion | 317/158 |
| 3,232,231 | 2/1966 | De Maria et al. | 101/395 |
| 3,257,944 | 6/1966 | Gray | 101/401.1 |
| 3,662,050 | 5/1972 | Willett | 264/102 |
| 3,670,646 | 6/1972 | Welch | 101/382 MV |

*Primary Examiner*—Willard E. Hoag

*Attorney, Agent, or Firm*—Jacox & Meckstroth

[57] ABSTRACT

A flexible resilient printing plate adapted for use on a magnetic printing cylinder is formed by mixing a ferrous metal powder within a volume of liquid vinyl plastisol, casting the mixture onto a face layer of at least partially cured vinyl plastisol to form a base layer, and then heating the combined layers to cure the base layer and fuse it to the face layer to form a flexible multiple layer mold sheet. The base layer is shaved to provide the mold sheet with a substantially uniform thickness, and a porous fibrous impression mat is placed in contact with the face layer. The mat and mold sheet are heated and are placed within a diaphragm press with a porous cloth between the mold sheet and the diaphragm. The mold sheet is pressed into the mat to form a printing plate which is allowed to cool during the pressing operation. The mat and plate are magnetically retained on the bed for a shaver, and the base layer of the plate is shaved to produce a precise uniform caliper. After the printing plate is shaved and stripped from the porous mat, it is reheated until it relaxes. The reheated plate is placed on a drum having an outer diameter the same as the magnetic cylinder and is held in firm contact with the drum until the plate cools.

4 Claims, 20 Drawing Figures

FIG-1
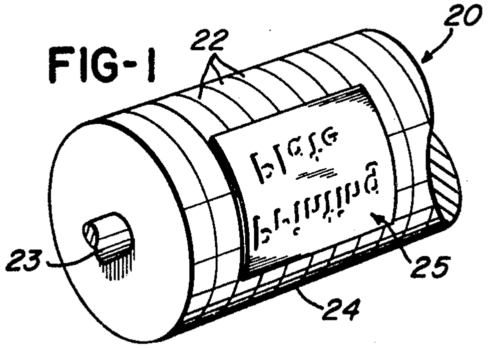
FIG-2
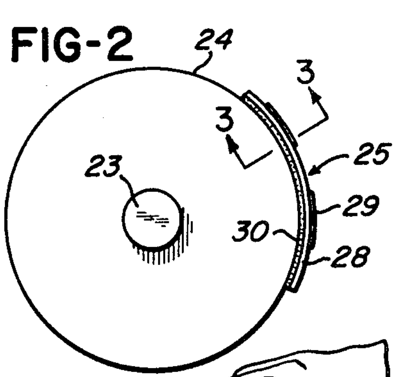
FIG-3
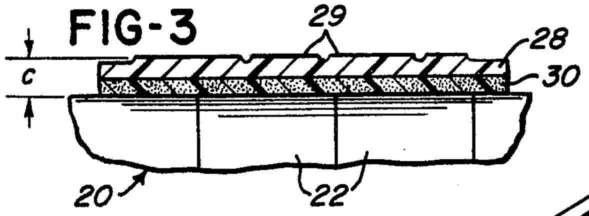
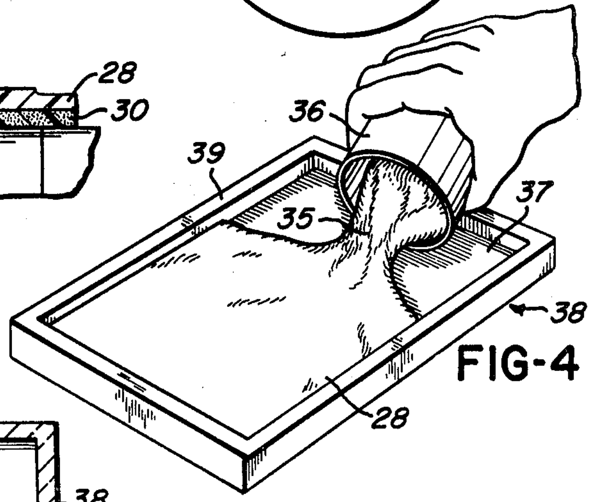
FIG-4
FIG-5
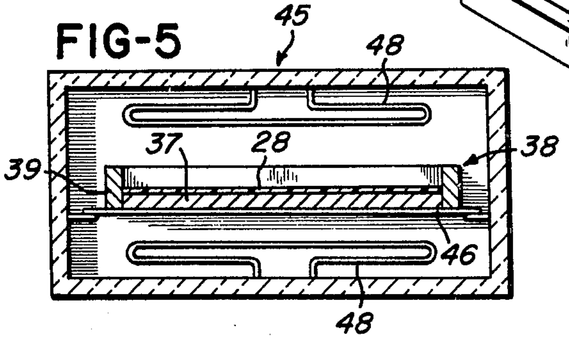
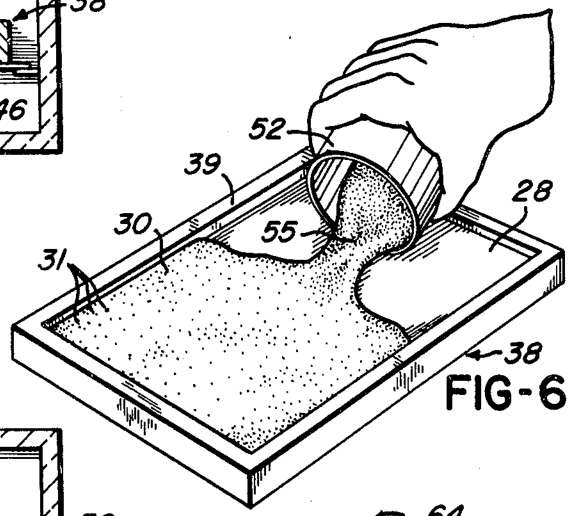
FIG-6
FIG-7
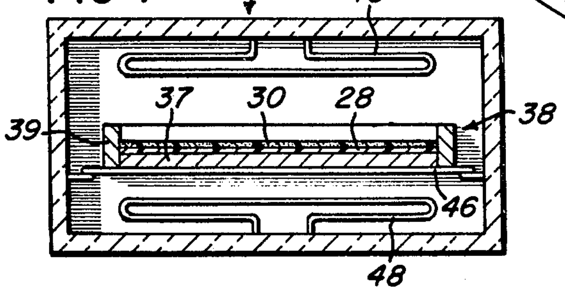
FIG-8
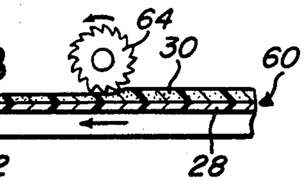

METHOD OF MAKING A MAGNETIC FLEXIBLE PRINTING PLATE

RELATED APPLICATIONS

This application is a continuation-in-part of coopending application Ser. No. 452,058, filed Mar. 18, 1974, now adandoned which is a continutation-in-part of copending application Ser. No. 194,651, filed Nov. 1, 1971 and of copending application Ser. No. 290,852, filed Sept. 21, 1972, now U.S. Pat. No. 3,837,959.

BACKGROUND OF THE INVENTION

In the making of flexible printing plates, usually a sheet of uncured rubber is placed in overlying relation with a flat rigid mold of thermosetting plastics material and in which is formed a recess of the impression to be printed. The mold and rubber sheet are placed within a press which is heated while the rubber sheet is pressed into the mold to cure the rubber and form the printing plate. A sheet of double face adhesive tape is frequently attached to the back surface of the molded rubber printing plate, and the tape carries a protective covering which is removed when it is desired to attach the plate to a roll or cylinder of a printing press.

While the double face adhesive tape provides for quickly attaching a rubber printing plate to the outer cylindrical surface of a printing cylinder, it is difficult to adjust the position of the plate precisely on the surface of the supporting cylinder. That is, the plate must be pulled or stripped from the cylinder each time it is desired to shift the position of the plate by a fraction of an inch.

Another method of attaching a flexible rubber printing plate to a cylinder is by constructing the cylinder so that it has a magnetized outer surface which attracts a magnetically attractable rubber sheet which is laminated to the back of the rubber printing plate. One such magnetic cylinder is manufactured and sold by the Dayco Corporation, Dayton, Ohio. This company also produces an uncured rubber sheet in which is dispersed ferrous metal particles. This sheet is placed adjacent the sheet of uncured rubber mold material before the latter sheet is cured within a heated press so that the magnetically attractable rubber sheet is laminated to the rubber mold sheet during the molding and curing operation.

It has been found that a number of prolems are encountered in the manufacturing and using of magnetically attractable rubber printing plates. For example, air is frequently entrapped between the uncured rubber mold sheet and the uncured magnetically attractable rubber sheet when the sheets are being laminated together during the molding operation. This entrapped air prevents a continuous bond or lamination of the sheets. There is also a problem of air being entrapped within the recessed impression of the mold. This entrapped air results in pockets being formed within the printing surface of the rubber plate.

It is also difficult to mold the combined rubber sheets to obtain a printing plate of precisely uniform thickness or caliper. When the laminated molded rubber printing plate varies by a few thousandths in thickness, the paper web or other sheet being printed must be pressed against the printing surface of the rubber printing plate with substantial pressure so that the entire printing surface prints effectively. This pressure significantly reduces the useful printing life of the rubber plate.

In some rubber molded plates where the printing surface has fine detail, it has been found necessary to grind the back surface of the plate after it is mounted in an inverted manner on the roll of a grinding machine. This grinding operation must be performed slowly to minimize the springback of the surface as a result of the resiliency of the rubber material. As a result, the grinding operation significantly increases the cost of using a rubber printing plate.

The printing surface of a rubber printing plate is also distorted when the printing plate, which is molded in the flat, is mounted on a printing cylinder. That is, the axially spaced edges of the plate or of the printing surface tend to project above the remaining portion of the surface when the plate is curved to conform to the curvature of the cylinder. The greater the thickness or caliper of the plate and/or the smaller the diameter of the printing cylinder, the more pronounced this deformation becomes. Thus with small diameter cylinders such as those having a three inch or four inch outer diameter, it is frequently desirable to grind the back surface of the plate to achieve a uniform caliper.

SUMMARY OF THE INVENTION

The present invention is directed to an improved flexible printing plate which is ideally suited for mounting on a magnetic cylinder of a printing press and which substantially reduces the time required for mounting and positioning the plate on the cylinder. The printing plate of the invention is also simple and economical to produce and provides a printing surface which is precisely concentric with the outer surface of the cylinder. As a result, the plate does not have to be ground and is capable of producing fine detail with the minimum of pressure between the printing surface of the plate and the paper web or other sheet being printed so that the printing life of the plate is significantly increased. The flexible printing plate of the invention also provides for substantial magnetic attraction so that it is positively retained in position on a magnetic printing cylinder.

In accordance with one embodiment of the invention, a flexible printing plate is constructed by casting a volume of liquid plastisol to form a flat face layer which is heated and cured within an oven. A metal powder is uniformly mixed by weight with another volume of plastisol, and the mixture is cast over the cooled face layer, and the combined layers are reheated in an oven to cure the base layer and fuse it to the face layer. The multilayer thermoplastic mold sheet is cooled and then shaved to remove the scale from the back surface of the base layer and provide the mold sheet with a generally uniform thickness or caliper.

A porous mold matrix or mat is placed in contact with the face layer of the mold sheet, and the combined mat and mold sheet are heated to approximately 400°. The mat and mold sheet are then pressed together within a press having a resilient diaphragm which is expanded to engage the base layer and to surround the edges of the mold sheet. The impression within the mat is molded into the face layer of the mold sheet to form a flexible printing plate which is allowed to cool during the pressing operation.

After the printing plate is removed from the diaphragm press, the base layer is heated, and the combined porous mat and printing plate are placed within a caliper mold which is pressed within the diaphragm press to bring the mold printing plate to a precise uniform caliper. The edges of the printing plate are then trimmed, after which the plate is reheated to approximately 200° F until the plate relaxes and becomes somewhat pliable. The reheated plate is positioned on a drum having an outer diameter the same as the magnetic printing cylinder which eventually receives the plate, and the plate is held in firm contact with the drum by a resilient elastic sheet which engages the outer surface of the plate.

In accordance with another embodiment of the invention, the mold sheet and mat are bounded by magnetically attractable strips before the mold sheet is heated and pressed into the mat. The strips serve to retain the mat and resulting printing plate on a magnetic base plate secured to the bed of a shaving machine and provide for shaving the base layer to produce a precisely uniform printing plate.

Other features and advantages of the invention will be apparent from the following description, the accompanying drawings and the appended claims.

BRIEF DESCRIPTION OF THE DRAWINGS

FIG. 1 is a fragmentary perspective view of a magnetic printing cylinder on which is mounted a flexible printing plate constructed in accordance with the invention;

FIG. 2 is an axial end view of the magnetic cylinder and printing plate shown in FIG. 1;

FIG. 3 is an enlarged fragmentary view of the printing cylinder and an enlarged section of the printing plate as taken generally on the line 3—3 of FIG. 2;

FIG. 4 is a perspective view illustrating the casting of the face layer of the printing plate shown in FIGS. 1–3;

FIG. 5 is a diagrammatic section through an oven and illustrating the curing of the face layer;

FIG. 6 is a perspective view similar to FIG. 4 and illustrating the casting of a base layer onto the cured face layer;

FIG. 7 is a view similar to FIG. 5 and illustrating the curing of the base layer and fusing of both layers;

FIG. 8 is a diagrammatic view of a shaving machine and illustrating the shaving of the outer surface base layer of the mold sheet formed in FIG. 7;

DESCRIPTION OF THE PREFERRED EMBODIMENTS

Figure 9:
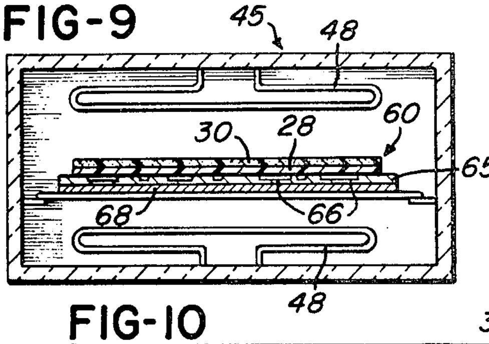
FIG. 9 is a view similar to FIGS. 5 and 7 and illustrating the heating of the mold sheet in contact with a porous mold mat.

Referring to FIGS. 1–3, a magnetic printing roll or cylinder 20 includes a series of axially arranged discs 22 which are mounted on a support shaft 23 and include corresponding permanent magnets. The outer surface 24 of the cylinder 20 is ground to be precisely concentric with the axis of the cylinder.

In accordance with the present invention, a flexible printing plate 25 is mounted on the outer surface 24 of the cylinder 20 and is positively retained by the magnetic attraction between the printing plate and the magnetic discs 22. However, while the flexible printing plate 25 is particularly adapted for mounting on a magnetic printing cylinder, It is to be understood that the printing plate 25 may be attached to a non-magnetic printing cylinder with the use of double face adhesive tape.

The flexible printing plate 25 includes a face layer 28 which has a resilient raised detailed printing surface 29, as will be explained later. The face layer 28 is fused to a base layer 30 containing a ferrous metal powder or particles 31 which are uniformly dispersed to provide a substantial magnetic attraction with the outer surface 24 of the printing cylinder 20. As illustrated in FIG. 2, the outer printing surface 29 of the plate 25 defines a cylindrical plane which is precisely concentric with the outer surface 24 of the cylinder 20 so that a minimum pressure is required between the outer surface 29 of the printing plate 25 and the web of paper or other material which is to receive the impression of the printing surface 29.

As indicated above, FIGS. 4–14 illustrate a method for producing the flexible thermoplastic printing plate 25. While the method steps have produced a printing plate 25 which prints with highly satisfactory results, it is to be understood that the invention is not limited to these precise steps and that the steps may be modified or performed in a different manner without departing from the scope of the invention. However, the steps are illustrative of a simle and inexpensive method for producing a flexible printing plate which not only has a precise uniform thickness or caliper C (FIG. 3), but is capable of being firmly retained on a magnetic printing cylinder, and provides for fine detailed printing over a long period of service.

Referring to FIG. 4, the face layer 28 of the printing plate 25 is initially made by pouring or casting a liquid vinyl plastisol 35 from a container 36 onto the flat bottom wall 37 of a tray-like mold 38 which includes a frame 39 surrounding the bottom wall 37. One plastisol material which has provided successful results is one produced by the Ohio Sealer Company, Dayton, Ohio and sold under the number 7-471-C. The plastisol 35 is cast to a substantially uniform depth of about 0.010 inch and is stirred gently with a probe to remove all air bubbles. The mold 38 and the face layer 28 of plastisol 35 are placed within an oven 45 having a rack 46 for supporting the mold 38 and electrical heating elements 48 for maintaining the oven at a temperature of between 350° F and 400° F. After the aluminum mold 38 and face layer 28 of plastisol have been heated in the oven for approximately 15 to 25 minutes to cause the resin of the plastisol to dissolve within the plasticizer and solidity, the mold 38 is removed, and the face layer 28 is allowed to cool to substantially room temperature.

The base layer 30 is then poured or cast from a container 52 onto the cool face layer 28 as illustrated in FIG. 6. The base layer 30 consists of a mixture 55 of dry ferrous or iron powder within a volume of liquid vinyl plastisol. This mixture 55 is prepared in the container 52 by mixing the iron powder and the plastisol at a relative weight ratio of approximately 3.0 ounces of metal powder for each ounce of liquid plastisol. The iron powder is preferably very fine and within a size range of 10–20 microns. The iron powder and plastisol material are mixed slowly until the powder is uniformly dispersed through the plastisol and without forming any air bubbles in the mixture. The mixture 55 is poured into the mold 38 to a substantially uniform depth preferably between 0.080 inch and 0.235 inch depending on the desired thickness for the base layer 30. One form of iron powder which has provided successful results is one produced by the Pyron Company, Niagara Falls, N.Y. and sold under lot number 3-BC.

The mold 38 with the cured face layer 28 and the liquid base layer 30, are returned to the oven 45 which, as mentioned above, is maintained between 350° F and 400° F. In approximately 15 to 25 minutes within the oven 45, the plastisol mixture cures and solidifies to form the base layer 30 and to fuse it with the face layer 28 to form a two-layer thermoplastic flexible mold sheet 60. The mold sheet 60 is allowed to cool to approximately room temperature within the mold 38 after the mold is removed from the oven 45.

After the cooled mold sheet 60 is removed from the mold 38, the sheet 60 is placed with the face layer in contact with a horizontal movable flat bedplate 62 (FIG. 8) of a shaving machine having a shaving roll 64. The mold sheet 60 is fed under the shaving roll 64 to remove a scale which is formed on the bottom surface of the base layer 30 when the layer was cured in the oven 45 shown in FIG. 7. Thus the shaving roll 64 exposes the fine pores within the base layer 30 and provides the mold sheet 60 with the generally uniform thickness or caliper.

Referring to FIG. 9, a porous matrix or mat 65 is formed from a compressed fibrous paper material and is molded with a recessed impression 66 corresponding to the detail printing surface 29 desired on the printing plate 25. The impression side of the mat 65 is positioned in contact with the face layer 28 of the thermoplastic mold sheet 60, and the other side of the mat 65 is placed in contact with a flat steel support plate 68. This assembly of the mold sheet 60, mat 65, and support plate 68 is placed back into the oven 45 and is heated to approximately 400° F. The assembly is then removed from the oven 45, and a porous creeper cloth 70, consisting of a layer of nylon cloth overlying a layer of canvas duck material, is placed over the base layer 30 of the mold sheet 60.

The heated mold sheet 60 and mat 65 are then placed within a press 75 with the support plate 68 contacting a lower press platen 76. The press 75 includes an upper platen 78 which supports a resilient flexible rubber diaphragm 82 secured to the platen 78 by a rectangular frame 83. Compressed air at a pressue of between 100 and 125 psi is supplied through a passage 84 within the upper platen 78 to the space behind the diaphragm 82 and causes the diaphragm to press the heated face layer 28 of mold sheet 60 into the mat 65. The creeper cloth 70 is effective to prevent the mold sheet 60 from adhering to the diaphragm 82 and to provide venting of air entrapped between the mold sheet 25 and the diaphragm 82.

Figure 10:
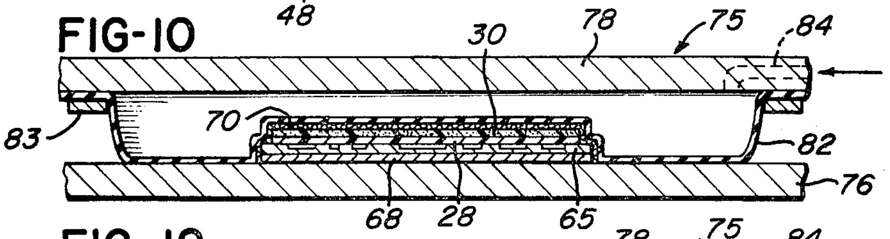
FIG. 10 is a schematic section through a diaphragm press and illustrating the molding of the mold sheet to receive the impression of the porous mold mat.
Figure 12:
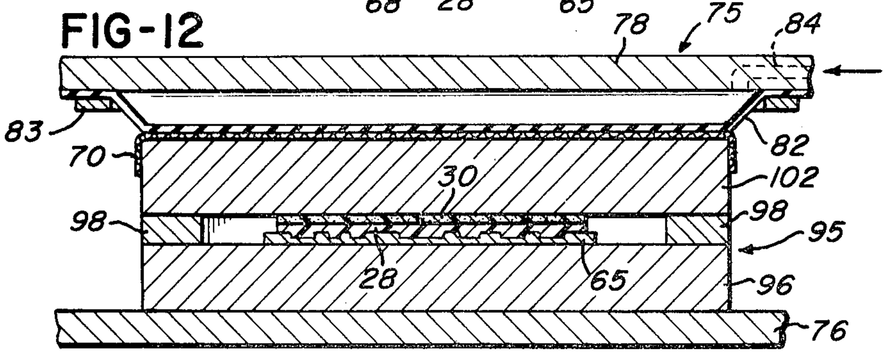
FIG. 12 is a diagrammatic section through a calibration mold and illustrating the pressing of the printing plate to a precise caliper.

As illustrated in FIG. 10, the diaphragm 82 also surrounds the edges of the mold sheet 60 to resist lateral flow of the mold sheet and thereby assure that the face layer 28 of the mold sheet fills the entire impression 66 within the mat 65. As a result of the porosity of the mat 65, the air which is trapped within the impression 66 of the mat 65 during the pressing operation, is forced into and through the mat 65 for escape to atmosphere. This assures that the entire impression 66 within the mat 65 is filled with the heated plastisol forming the face layer 28 and that no air pockets are formed within the resulting printing surface 29 of the printing plate. While the face layer 28 is being pressed into the impression 66 within the porous mat 65 under the pressure exerted by the flexible diaphragm 82, the mold sheet 60 cools to form the printing plate 25. The mat 65 and this pressing operation are effective to produce a printing surface having very high fidelity and within the full range of 80 to 133 half tone dots per inch.

Figure 11:
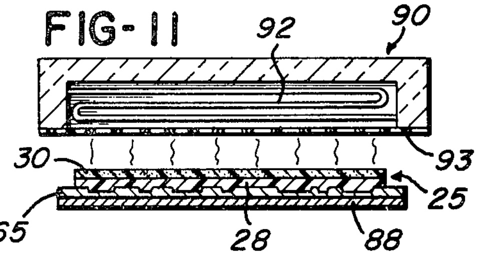
FIG. 11 is a diagrammatic section of a heating unit and illustrating the heating of the base layer of the printing plate molded in FIG. 10.

Referring to FIG. 11, the assembly of the printing plate 25 and the mat 65 are positioned on a support plate 88 so that the base layer 30 of the plate faces a heating unit 90 having a heating element 92 and an aluminum grid 93 which uniformly diffuses the heat from the heating element 92. The base layer 30 is heated until it begins to soften on its upper or back surface.

The assembly is then placed within a calibration mold 95 (FIG. 12) which includes a base steel plate 96 on which is mounted a caliper frame 98 having a height corresponding to the desired calibration C for the printing plate 25 and the thickness of the mat 65. The mat 65 is placed in contact with the base plate 96 of the calibration mold 95, and a thick aluminum plate 102 is placed on top of the heated base layer 30 of the printing plate 25.

The assembled calibration mold 95 is placed within the press 75, and the diaphragm 82 is pressurized with air at a pressure of between 100 and 125 psi. This uniform pressure on the aluminum plate 102 causes the heated base layer 30 to expand or flow laterally, as illustrated by the projecting edge portions of the layer 30 in FIG. 12, until the combined mat 65 and printing plate 25 have a precisely uniform thickness corresponding to the height of the caliper frame 98. As the aluminum plate 102 conducts heat from the base layer 30 during the pressing operation, the base layer cools. After the base layer has cooled to below 100° F, the press 75 is released, and the printing plate 25 and mat 65 are removed from the caliper mold 95. The plate 25 is then stripped from the mat 65, and the edges of the plate 25 are trimmed on a shear.

Figure 13:
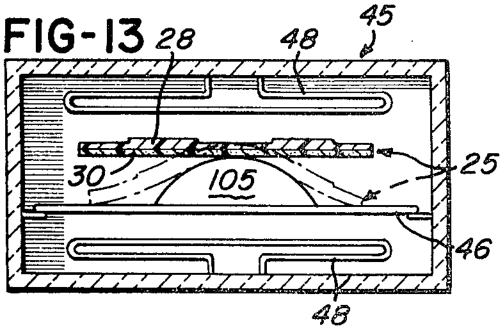
FIG. 13 is a diagrammatic view similar to FIG. 5 and illustrating the reheating of the printing plate after it is molded to a uniform caliper.

Referring to FIG. 13, after the printing plate 25 is stripped from the porous mat 65 and trimmed, the plate 25 is placed back within the oven 45 and positioned on a curved support member 105. The plate 25 is reheated to a temperature of approximately 200° F so that the plate relaxes and droops as indicated by the dotted lines in FIG. 13. The reheated plate 25 is removed from the oven 45 and placed on a hollow cylindrical drum 108 which has an outer diameter the same as the printing cylinder 20 which is to receive plate 25. The reheated plate is positioned with the base layer 30 in contact with the outer surface of the drum 108, and the plate is held in firm contact with the drum 108 by a press member 110 having a flexible rubber diaphragm 112 which is pressurized to engage the outer surface of the face layer 28. The reheated plate may also be held in firm contact with the drum 108 by a wide flexible rubber band which is stretched over the outer surface of the plate 25.

After the printing plate 25 cools under the uniform pressure exerted by the diaphragm 112, the air pressure is released, and the plate 25 is removed from the drum 108. While the printing plate 25 may be stored in a flat condition, the reforming process of FIGS. 13 and 14 assures that the outer printing surface 29 of the plate 25 is precisely concentric with the outer cylindrical surface 24 of the cylinder 20 when the plate is positioned on the cylinder. The change in the printing surface 29 as a result of the reforming operation is very minute and is usually not visually detectable. It is also possible to curve the printing plate 25 prior to stripping or peeling the plate from the mat 65. In this case, the assembly of the plate 25 and mat 65 are heated and then allowed to cool while being held against the drum 108.

Figure 15:
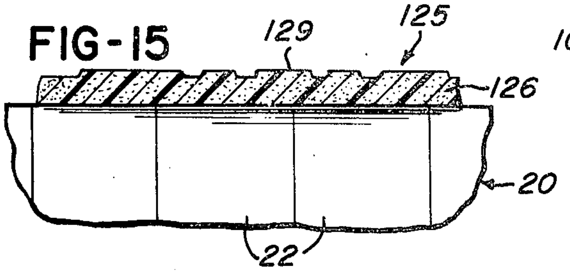
FIG. 15 is a view similar to FIG. 3 and showing a modified form of a printing plate constructed in accordance with the invention.
Figure 16:
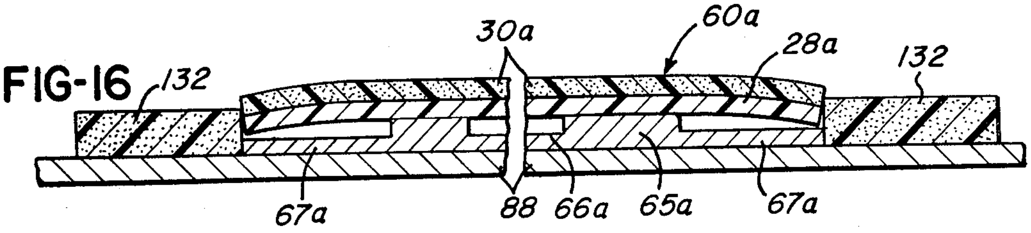
FIG. 16 is an enlarged fragmentary section of a mold sheet and mat assembly prepared in accordance with a modification of the invention and illustrated during the step of heating in the oven shown in FIG. 9.
Figure 17:
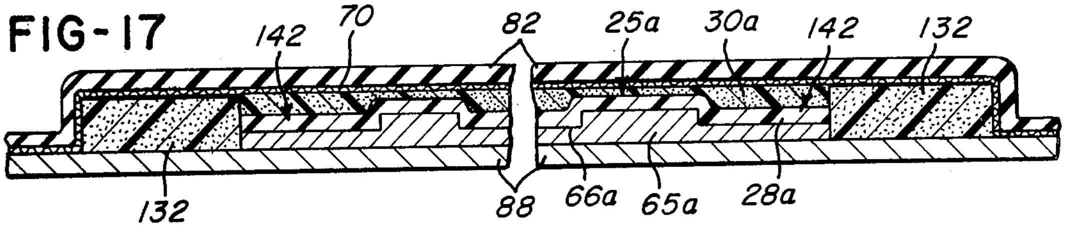
FIG. 17 is an enlarged section similar to FIG. 16 and illustrating the pressing of the mold sheet and mat within the diaphragm press shown in FIG. 10.
Figure 18:
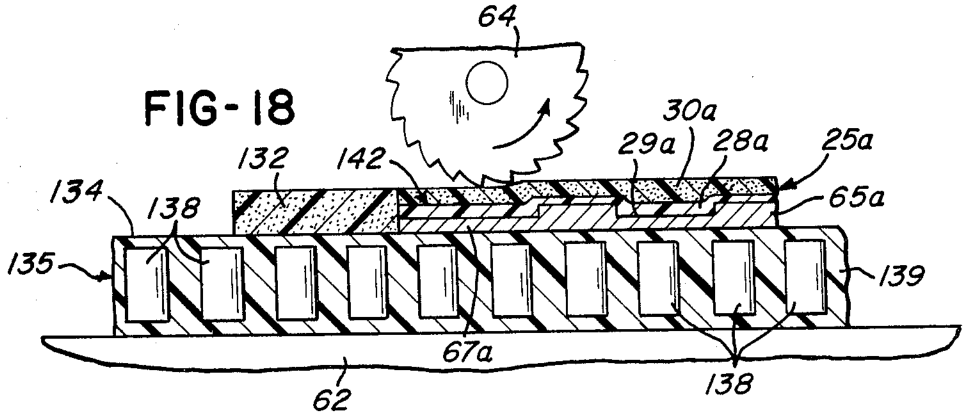
FIG. 18 is an enlarged fmogmentary section of the molded printing plate and mat assembly and schematically illustrating the shaving of the plate with the mat attached.
Figure 19:
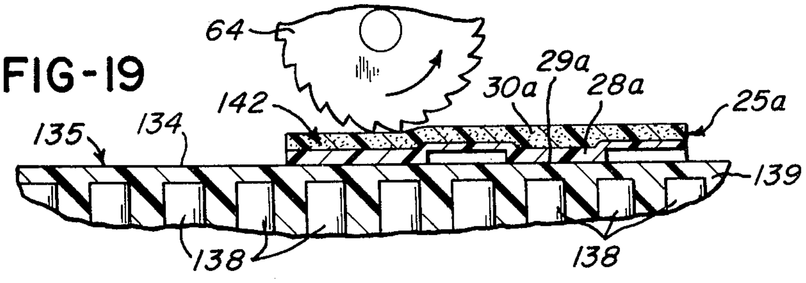
FIG. 19 is an enlarged section similar to FIG. 18 and illustrating the shaving of the printing plate after the mat is removed.

In reference to FIG. 15 which shows a modification of the invention, a printing plate 125 is constructed in substantially the same manner as the printing plate 25 except that the face layer 25 and base layer 30 are formed as one layer 126, and the ferrous metal powder or particles 31 are dispersed throughout the entire layer 126. That is, the layer 126 is formed of the mixture 55 of liquid vinyl plastisol and ferrous metal powder mixed at the weight ratio of approximately 1 : 3.0 as mentioned above. Since the metal powder is exposed on the printing surface 129 of the plate 25, the printing surface 129 is harder and less resilient than the printing surface 29 of the multiple layer printing plate 25 and results in a shorter service life.

Referring to FIGS. 16–20 which show a modified form of making a flexible printing plate in accordance with the invention, the mold sheet **60*a* is positioned on a porous fibrous mat 65*a* which includes a rectangular frame-like border portion or flange 65*a* recessed to a level corresponding with the level of the recessed impression 66*a*. A series of elongated rectangular bearers or retaining strips 132 consisting of the thermoplastic mixture 55, are positioned on the support plate 88 in a frame-like manner bordering or surrounding the corresponding eges of the rectangular mat 65*a* and the mold sheet 60*a*. The assembly of the mat 65*a*, mold sheet 60*a* and retaining strips 132 are placed within the oven 45 (FIG. 9**) and are heated to approximatey 350° F. for a period of approximately four minutes.

The heated assembly is then transferred to the press 75 where the diaphragm 82 is pressurized to a pressure of approximately 120 p.s.i. to effect a uniform pressure of the mold sheet **60*a* against the mat 65*a*. The heating and pressing operations are effective to form the impression 66*a* within the mold sheet 60*a* as mentioned above, and also to fuse the frame-like arrangement of thermoplastic retaining strips 132 to the corresponding outer edges of the thermoplastic mold sheet 60*a*. As also mentioned above, the mold sheet 60*a* is allowed to cool while the pressure is being applied by the diaphragm 82 of the press 75, and thereby form the printing plate 25*a***.

After the assembly of the printing plate **25*a*, the mat 65*a* and the retaining members or strips 132 are cooled and removed from the diaphragm press 75, the assembly is placed upon the upper surface 134 of a magnetic base member or retaining plate 135 which is secured to the reciprocal bed 62 of a shaving machine having shaving roll 64. The retaining plate 135 includes a rectangular arrangement of closely spaced permanent magnets 138 which are recessed within a plate-like body 139 of an epoxy material. After the base plate 135 is mounted on the bed 62 of the shaver, the upper surface 134 of the base plate 135 is shaved by the shaving roll 64 so that the surface 134 is precisely parallel with the outer surface of the shaving roll 64 and remains precisely uniform during linear movement of the bed 62**.

When the assembly of the printing plate **25*a*, the porous mat 65*a* and the retaining strips 132 are placed or positioned on the magnetic base plate 135, the retaining strips 132 are positively attracted to the magnetic base plate 135 as a result of the ferrous or iron particles dispersed within the thermoplastics mixture 55 from which the strips 132 are molded or formed. Thus the printing plate 25*a* is positively retained or secured to the bed 62 of the shaving machine while several thousandths of material are shaved from the base layer 30*a* of the printing plate 25*a* by the rotating shaving roll 64**.

As mentioned above, it is desirable for the printing plate **25*a* to have a precisely uniform thickness or caliper which preferably does not vary more than 0.0005 inch. However, the thickness or caliper of the porous fibrous mat 65*a* cannot practically be held to such close tolerances and frequently varies plus or minus 0.002 inch in thickness of caliper. Thus after the base layer 30*a* of the printing plate 25*a* is shaved (FIG. 18) by one or more passes of the shaving roll 64, the printing plate 25*a* is stripped or removed from the mat 65*a*, and the magnetic bearers or retaining strips 132 are sheared or trimmed from the printing plate 25*a*. The printing plate 25*a* is then placed or positioned back on the magnetic base plate 135 (FIG. 19) where the printing plate 25*a* is retained on the base plate 135 by the magnetic attraction between the magnets 138 and the ferrous particles within the base layer 30*a* of the plate 25*a***.

Figure 20:
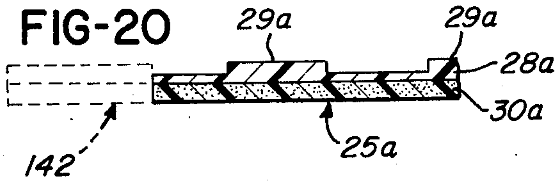
FIG. 20 is an enlarged fragmentary section of a final printing plate after it has been shaved and the border portion has been trimmed.

The printing plate **25*a* is again shaved to remove one or two thousandths of material from the base layer of 30*a* and thereby provide the printing plate with a precisely uniform thickness or caliper at the printing surface 29*a*. As a esult of the outwardly projecting frame-like flange 67*a* on the mat 65*a*, the initial printing plate 25*a* is provided with an integral frame-like peripheral border portion 142 which has the same thickness or caliper as the remaining portion of the printing plate at the printing surface 29*a*. After the final shaving operation (FIG. 19), the frame-like border portion 142 is trimmed from the printing plate 25*a* (FIG. 20). However, during the shaving operation, the border portion 142 assists in assuring that the printing plate 25*a* is shaved to a precisely uniform caliper along the entire printing surface 29*a*. That is, the border portion 142 assures that the edges of the printing do not curve or roll downwardly during the shaving operation and thereby prevent a uniform contact pressure of the printing surface 29*a* of the printing plate on the surface 134 of the magnetic retaining base plate 135**.

From the drawings and the above description, it is apparent that a flexible thermoplastic printing plate constructed in accordance with the invention provides several desirable features and advantages. For example, the printing plate 25 or 25*a* has a precisely uniform thickness or caliper C which does not vary more than 0.0005 inch. The printing plate 25 or 25*a* also as a vinyl face layer forming a printing surface 29 or 29*a* which has high fidelity and is precisely concentric with the outer surface of the cylinder on which the plate is mounted. This precise uniform caliper and uniform concentricity provide for minimizing the pressure between the printing surface 29 or 29*a* and the paper web or sheet being printed. As a result, the printing plate 25 or 25*a* has a relatively long printing life.

The construction of the printing plate in two layers from a liquid thermoplastic plastisol also provides an important feature of the invention. That is, the liquid vinyl resin and plasticizer provide for conveniently adding and mixing a fine iron powder into the liquid so that when the mixture is heated to cause the resing to dissolve in the plasticizer, the mixture is converted to a solid layer with the powder uniformly dispersed within the layer. This dispersion of the iron powder effectively provides for a substantial magnetic attraction between the printing plate and a magnetic cylinder 20. While the preferred weight ratio of iron powder and liquid plastisol is approximately 3.5 : 1, the weight ratio should be at least 2 : 1 to provide a satisfactory magnetic attraction. The liquid plastisol is also convenient to handle and, as illustrated in the drawings, requires relatively simple and inexpensive equipment for producing a high quality flexible printing plate. As a result, with only a relatively small capital investment for equipment, high quality printing plates may be produced for a printing press equipped with magnetic cylinders.

The use of the porous matrix or mat 65 and 65*a* and the resilient rubber diaphragm 82 within the press 75 also provides important advantages. That is, the porous mat 65 or 65*a* provides for releasing air entrapped within the recessed impression 66 or 66*a* during the molding operation so that the heated plastisol completely fills all of the detail of the impression. The resilient diaphragm 82 is not only effective to provide uniform pressure against the mold sheet 60 or 60*a*, but also restrains the edges of the mold sheet to minimize lateral flow of the mold sheet and thereby assure filling of the impression 66 or 66*a*. This assurance is especially important when the printing surface includes fine detail.

The operation of shaving the metal particles and the vinyl within the base layer is also important in that it provides for quickly producing a printing plate with a precisely uniform thickness or caliper. Furthermore, the molding of the printing plate 25*a* with the magnetic retaining bearers or strips 132 (FIGS. 16 and 17) and the shaving of the printing plate 25*a* on the magnetic base plate 135 (FIGS. 18 and 19) provide another means for obtaining a flexible printing plate of precision caliper.

Figure 14:
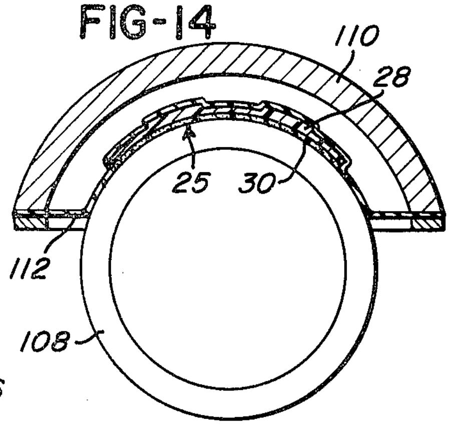
FIG. 14 is a radial section of a device for reforming the printing plate after it is reheated as illustrated in FIG. 13.

In addition, the reforming of a thermoplastic printing plate by the steps illustrated in FIGS. 13 and 14, is effective to assure a precisely concentric printing surface 29 or 29*a* when the printing plate is mounted on a magnetic cylinder 20. That is, the reforming operation provides for producing a relaxed plate which naturally conforms precisely to the curvature of the cylinder without creating internal stresses within the plate. This is especially important when the plate is to be used on a cylinder having a relatively small diameter such as a diameter of three inches.

While the methods and forms of printing plates herein described constitute preferred embodiments of the invention, it is to be understood that the invention is not limited to these precise methods and form of printing plates described, and that changes may be made therein without departing from the scope and spirit of the invention as defined in the appended claims.

The invention having thus been described, the following is claimed:

1. An improved method of making a flexible printing plate adapted to be mounted on a magnetic cylinder of a printing press, comprising the steps of mixing a ferrous metal powder within a liquid vinyl material to form a mixture, forming a face layer of at least partially cured vinyl material substantially free of the ferrous metal powder, casting the mixture onto the face layer of at least partially cured vinyl material to form a base layer of gnerally uniform thickness, heating the base layer with the face layer to fuse the layers into a multilayer mold sheet of substantially uniform thickness, placing the face layer of the mold sheet into contact with a porous printing plate mold having a substantially uniform thickness and a recessed impression, heating the assembly of the mold sheet and the printing plate mold, placing the heated assembly into a press having a fluid actuated diaphragm, pressurizing the diaphragm with uniform fluid pressure for pressing the face layer of the mold sheet into the recessed impression to form a printing plate having a rasied printing surface corresponding to the impression, allowing the assembly to cool while the mold sheet is being pressed against the printing plate mold, reforming the base layer including the ferrous metal powder to provide the printing plate with a precisely uniform caliper, and stripping the printing plate from the printing plate mold.

2. A method as defined in claim 1 including the step of preheating the porous printing plate mold to remove substantially all moisture from the mold before the face layer is pressed into the recessed impression.

3. A method as defined in claim 1 including the step of overlaying the base layer of the heated assembly of the mold sheet and the printing plate mold with a flexible porous cloth-like material prior to pressing the face layer of the mold sheet into the recessed impression of the printing plate mold, and removing the porous cloth-like material after the face layer of the mold sheet is pressed into the mold.

4. A method as defined in claim 1 wherein the base layer of the printing plate is reformed by shaving the base layer and the ferrous metal poweder while the printing plate mold remains attached to remove a portion of the base layer including a corresponding portion of the metal powder.

* * * * *